United States Patent [19]

Irvin

[11] Patent Number: 4,679,187
[45] Date of Patent: Jul. 7, 1987

[54] ADAPTIVE TRUNK-COMPRESSION SYSTEM WITH CONSTANT GRADE OF SERVICE

[75] Inventor: David R. Irvin, Raleigh, N.C.

[73] Assignee: International Business Machines Corp., Armonk, N.Y.

[21] Appl. No.: 725,880

[22] Filed: Apr. 22, 1985

[51] Int. Cl.$^4$ ............................................... H04J 1/16
[52] U.S. Cl. ....................................... 370/17; 370/79; 370/95; 379/113; 379/137
[58] Field of Search ............... 370/79, 95, 13, 17, 370/80, 89; 179/8 A, 9, 10, 18 BC, 18 AG; 379/113, 137

[56] References Cited

U.S. PATENT DOCUMENTS 4,456,788  6/1984  Kline et al. .................. 179/18 AG
4,556,972  12/1985  Chan et al. ........................ 370/95

Primary Examiner—Robert L. Griffin
Assistant Examiner—M. Huseman
Attorney, Agent, or Firm—Joscelyn G. Cockburn

[57] ABSTRACT

A dynamic trunk compression system for processing digitized speech signals. The system includes a monitoring apparatus which measure current traffic intensity at the trunk. The current traffic intensity drives an algorithm that periodically estimates blocking probabilities. When the blocking probabilities fall outside of a predetermined range, the trunk is repartitioned to provide more speech channels.

12 Claims, 5 Drawing Figures

ADAPTIVE TRUNK-COMPRESSION SYSTEM WITH CONSTANT GRADE OF SERVICE

BACKGROUND OF THE INVENTION (1) Field of the Invention

The present invention relates to speech processing in general and more particularly to the concentration/deconcentration of speech from and into a PBX system.

(2) Prior Art

The technique for processing telephone messages from a PBX installation onto a trunk line and vice versa is well known in the prior art. The conventional technique is usually static in that the trunk line is partitioned into a fixed number of channels designated to accommodate a particular number of incoming lines. Even though the total number of lines is not being utilized, the unused capacity in the trunk cannot be allocated to the active incoming lines. Needless to say that the reapportionment of the unused trunk line to the active incoming lines would greatly improve the overall operating characteristics of the PBX system.

SUMMARY OF THE INVENTION

It is therefore the general object of the present invention to provide a more efficient PBX telephone system than was heretofore possible.

It is another object of the present invention to provide a PBX system wherein the trunk capacity is dynamically partitioned to achieve a demand-determined degree of user compression while maintaining at least a specified grade of service.

The improved PBX telephone system provides the maximum speech quality consistent with the specified grade of service by dynamically trading quality against compression ratio.

The PBX telephone system includes an algorithm that is activated periodically in response to traffic intensity at the trunk. Upon activation, the algorithm estimates a blocking probability. If the blocking probability falls within a predetermined range, no adjustment is made to the system. However, if the blocking probability falls outside of the predetermined range, the trunk is repartitioned to provide more speech channels. Simultaneously therewith the bit rate in each channel is reduced thereby bringing the quality or grade of service back into the allowed range.

In particular, given the system loading the probability of system blocking ($P_b$) is periodically calculated and compared with a specified maximum and minimum level (say, $Y \leq P_b \leq Z$). When the predicted blocking $P_b$ falls outside of the desired range, the number of channels N is adjusted, in accordance with the algorithms shown in FIGS. 2, 3A and 3B, to reconfigure the system in the appropriate direction. This means that if the traffic intensity goes down the bit rate in each channel is increased thereby improving the grade of service. Likewise, if the traffic intensity goes up (i.e., increases) the bit rate in each channel decreases.

In one embodiment of the present invention the desired range was as follows: $0.01 \leq P_b \leq 0.05$.

The foregoing features and advantages of this invention will be more fully described in the accompanying drawings.

DETAILED DESCRIPTION OF THE PREFERRED EMBODIMENT

Figure 1A:
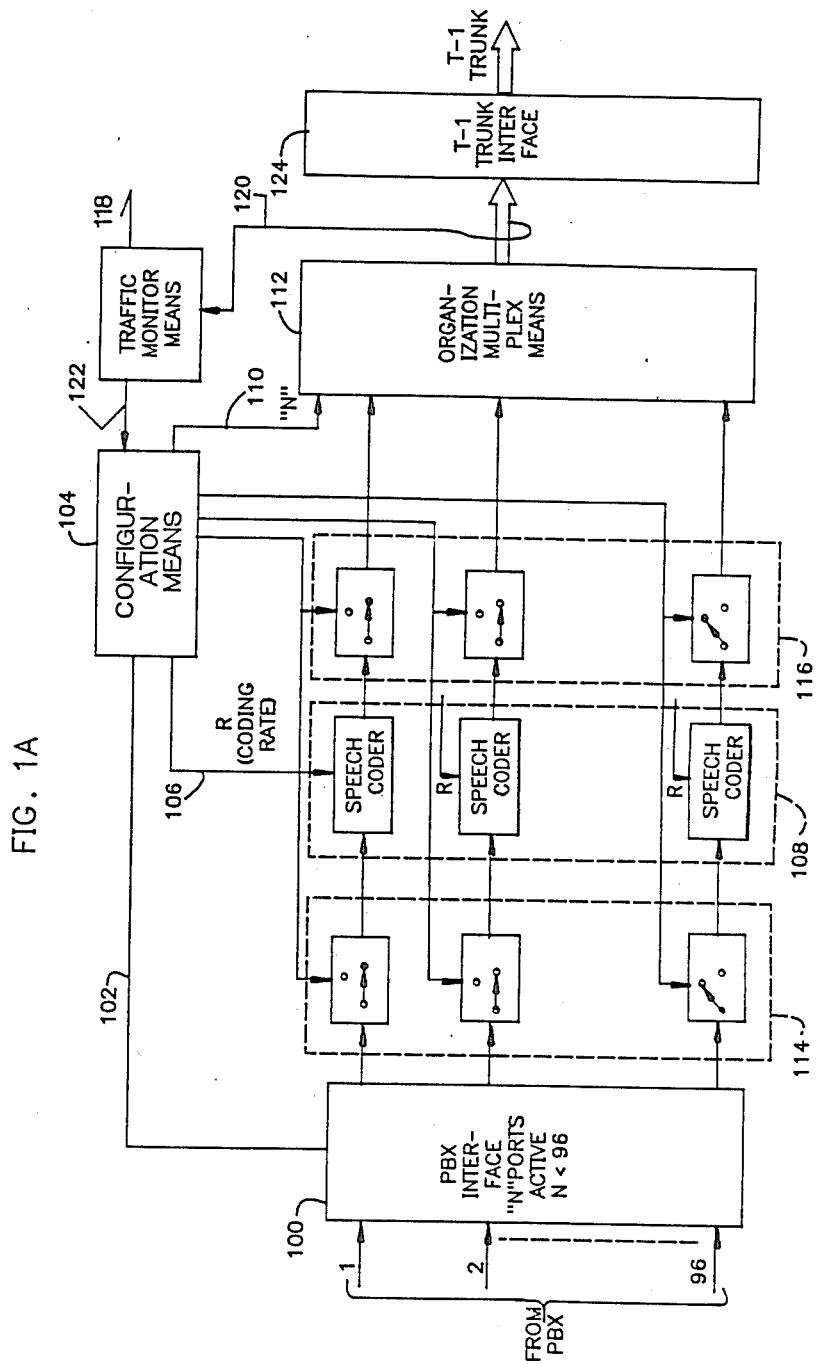
FIG. 1A shows a block diagram of a PBX telephone system embodying the teachings of the present invention. The figure shows telephone traffic in an outbound direction from the PBX telephone installation to a T-1 trunk.
Figure 1B:
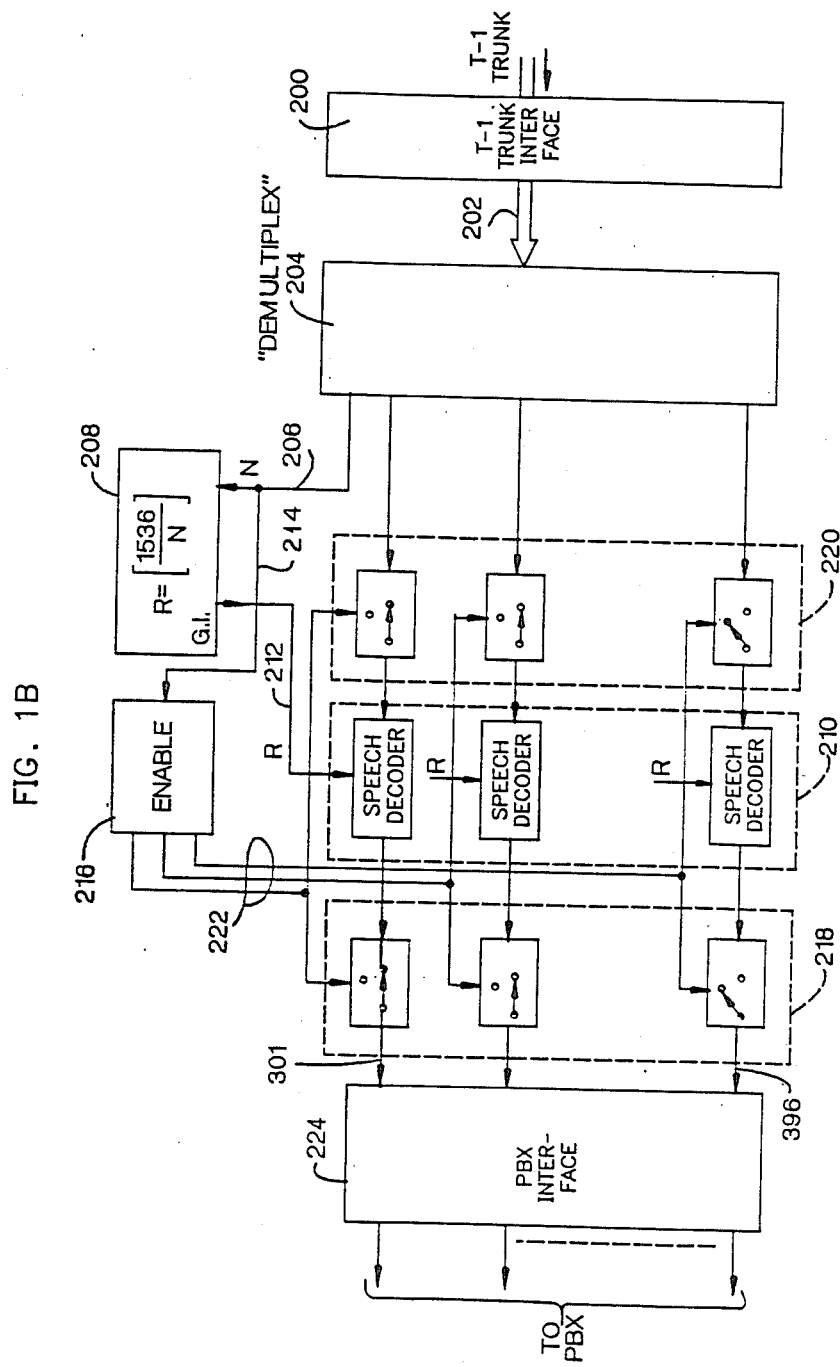
FIG. 1B shows a block diagram of the PBX telephone system embodying the teachings of the present invention. The figure shows telephone traffic in the inbound direction from the T-1 trunk to the PBX telephone installation.

FIGS. 1A and 1B show in block diagram form the PBX telephone system according to the teaching of the present invention. FIG. 1A shows traffic in the outbound direction while FIG. 1B shows traffic in the inward bound direction. The system is designed to compress a number of digitized signals into a single T-1 trunk. Although a trunk line with varying capacity is available, in the preferred embodiment of this invention the capacity of the trunk line is approximately 1.536 Mb/sec. It has been determined that a T-1 trunk having a capacity of 1.536 Mb/sec. can reasonably accommodate from 48 to 96 voice grade channels. This information is recorded in Table I below.

In addition to the channel capacity, Table I also shows the traffic intensity measured in Erlangs and the probability of system blocking which occurs when the trunk is partitioned into 48 and 96 channels. As will be described subsequently, whenever the probability of blocking falls outside of the range of 0.01 and 0.05, the algorithms to be described subsequently will partition the channel into an acceptable number of channels.

TABLE I

| 48 channels @ 32 kb/sec/channel = 1.536 M bit/sec. | | |
|---|---|---|
| 96 channels @ 16 kb/sec/channel = 1.536 M bit/sec. | | |
| Number of Channels (N) | Traffic Intensity in Erlangs | Probability of System Blocking |
| 48 | 36 | 0.01 |
| 96 | 90 | 0.05 |

It should be noted that the information of Table I is determined mathematically.

It should be noted that the capacity of the T-1 trunk, the number of channels assigned thereto, the traffic intensity, and the probability of system blocking chosen above are merely exemplary and are not intended to limit the scope or contents of the present invention since it is well within the skill of one skilled in the art to change these numbers without departing from the scope and spirit of the present invention.

Referring again to FIG. 1A, a number of lines identified by numerals 1–96 are outputted from a PBX telephone installation (not shown) into the PBX interface means 100. At a given time, a number, say "N" of these 96 lines may be in use. Of course, the maximum number of lines may be more or less than 96. Speech signals enter the system via these input lines in either analog form or as eight or twelve bit PCM. The number of active ports are fed over conductor 102 to system configuration means 104. As will be explained subsequently, the function of system configuration means 104 is to determine the values of the parameters "R" and "N", respectively. As is used herein, "R" represents the coding rate while "N" represents the number of channels.

The value of the parameter R is fed over conductor 106 to the bank of speech coders identified by numeral 108. The coder's specific operating rate is determined by a single input parameter (to be described subsequently) that is entered into the coder's bit assignment algorithm. The parameter takes the integer value R-3, where R is the desired bit rate in Kb/sec. It should be noted that the number 3 represents a 3 Kb/sec. overhead channel which among other things passes information regarding a block compander integral to the coding algorithm.

As will be explained subsequently, the rate R is determined by the following relationship:

$R = GI\{1536/N\}$, where N is the number of channels required and "GI" represents the greatest integer function.

Given a real floating-point variable x falling between two consecutive positive integers K and L, such that $K \leq x < L$, then the greatest integer function maps x to k:

$GI(x) = K$.

Likewise, the parameter "N" which is outputted from system configuration means 104 (FIG. 1) over conductor 110 into organization and multiplex means 112 identifies the number of channels which must be provided to accommodate a particular level of system loading.

Still referring to FIG. 1A, a bank off switches identified by numeral 114 interconnects the output from the PBX interface means 100 and to the input of the bank of sub-band speech coders 108. Each speech signal is compressed by a sub-band coder. Analog-to-digital conversion, if needed, is performed at this stage. Speech coders providing good speech quality at rates between 16 kg/sec. and 32 kb/sec. are well known in the prior art. Other types of speech coders (e.g., adaptive transform, adaptive differential PCM, etc.) are suitable for use in the present system. Similarly, a bank of switches identified by numeral 116 interconnects the output from the bank of speech coders 108 to the input of organization and multiplex means 112. By activating a number of selected switches from banks 114 and 116, respectively, a given number of coders S is made to output speech signals into the organization and multiplex means 112. The number of coders that are active at a particular time is determined (from the system loading and the allowed range of expected blocking probability) by the algorithm to be described below. Likewise, the same procedure (to be described below) sets the rate R of the speech coders.

A traffic monitor means 118 is coupled by means 120 to T-1 trunk. The traffic monitor means (to be described subsequently) tabulates the traffic or message or signal intensity impinging on the trunk. The intensity or utilization is measured in Erlangs and is fed over conductor 122 to system configuration means 104. A running average (that is, lowpass filter) of this measurement is the parameter "E" shown and described below in FIGS. 2 and 3 and will be described subsequently. From "E" and the current number of channels "N", the projected system blocking is calculated (FIGS. 2 and 3 to be described hereinafter) and the repartitioning decision (choosing a new number of channels "N") is made.

Still referring to FIG. 1A, the resulting signals from the bank of speech coders are serialized and multiplexed by organization and multiplex means 112 onto the T-1 trunk interface means 124. This interface guarantees that the interconnection restrictions imposed by the common carrier (for example, overvoltage protection, compatibility of signal levels, etc) are met. The value of "N" is included in transmissions to the receiver. The receiver uses N to ensure proper decoding.

The traffic monitor means decodes the in-band and explicit call establishment signaling transmitted via the T-1 carrier. The time of arrival of new traffic (i.e., the establishment of a circuit) at the T-1 interface is recorded in a call progress table, as is the time of departure (termination of the circuit) for said traffic. The "call arrival rate" (in calls/second) is determined from the record of arrivals. The average holding time per circuit or traffic duration is determined by the difference of the departure and arrival times. Traffic intensity "E" is the running average of the product of arrival rate and duration, expressed in Erlangs, for completed traffic. This value "E" is periodically sent to configuration means 104 by conductor 122, with update every 30 seconds in the preferred embodiment. At this time, the call-progress table entries for completed calls, comprising "E" are erased, freeing space for new arrivals, and the running average is reset.

Figure 2:
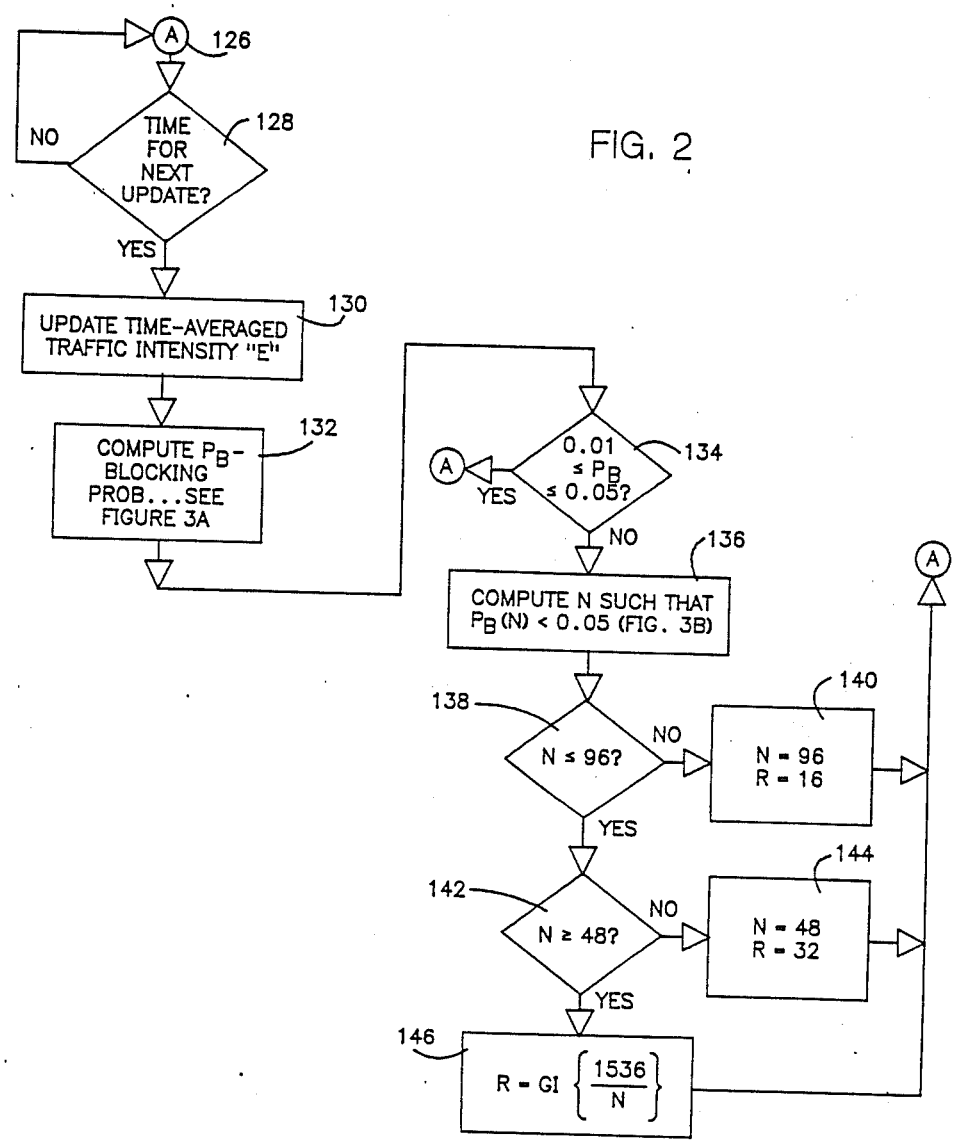
FIG. 2 shows a flow chart of the process steps and algorithm used to partition the T-1 trunk.

Referring now to FIG. 2, there is shown the process step and algorithm that are used in the configuration means 104 to determine R and N. Although it is well within the skill of the art to implement the algorithm in hardware, in the preferred embodiment of this invention the algorithm was implemented in a programmed microcomputer. Any conventional off-the-shelf microcomputer which is programmed in accordance with the flow chart shown in FIG. 2 can be used to implement the present invention. Therefore, a specific microprocessor will not be identified. Each block in FIG. 2 signifies a process step in the program of FIG. 2 and will now be described.

The first step in the program is identified by block 126. Block 126 is an entry point and signifies the point whereat the program is entered.

Step B is practiced in block 128. In this block the program checks to see if it is time for the next update. If it is not, the program re-enters block 126. If it is, the program exits the block into block 130. In block 130 the program checks to see what is the average traffic intensity "E". As described above, in relationship with FIG. 1A, the value of E is outputted from the traffic monitor means 118. The program then descends into block 132 where it computes the blocking probability "$P_b$". Details of this computation will be given subsequently in relationship with FIG. 3A.

From block 132 the program enters into block 134. There the program checks to see if the blocking probability $P_b$ falls within a prescribed range. As stated above, in the preferred embodiment of this invention, the prescribed range of blocking probability is between 0.01 and 0.05. Of course, other limits on the blocking probability $P_b$ can be selected without deviating from the scope and spirit of the present invention.

If the blocking probability ($P_b$) is within the prescribed limits, then the program loops back to block 126 and performs the previously described process steps. If the blocking probability ($P_b$) falls outside of the prescribed range, then the program descends into block 136. In block 136 the program computes "N" such that the blocking probability for $P_b(N)$ is less than 0.05. The technique used to compute N is shown in FIG. 3B and will be described subsequently.

From block 136 the program descends into block 138. In block 138 the program checks to see if N is less than or equal to the maximum number of channels which is allotted for the particular PBX telephone system to handle. Although (N) may be any desired number in the preferred embodiment of this invention, N was chosen to be 96. If N is not less than or equal to 96, the program exits block 138 along the no path into block 140. In block 140 the program sets the N parameter equal to 96 and the R parameter equal to 16. It should be noted that the values for N and R are chosen in a particular example and does not limit the scope of this invention. The key point is that N and R are set to fit the upper limit of the selected range. From block 140 the program loops back to block 126 to repeat the above-described process steps.

Still referring to FIG. 2, if N (block 138) is less than or equal to 96, the program exits along the yes path into block 142. In block 142 the program checks to see if N is greater than or equal to the lower number of assigned channels. In this particular example the lower limit is 48. If N is less than or equal to 48, the program exits block 142 along the no path into block 144. There the program sets N=48, R=32 and then re-enters the program in block 126. If N is greater than or equal to 48, the program exits block 142 along the yes path into block 146. In block 146 the program computes the value of R. As stated above, R=GI(1536/N). The program then re-enters block 126. The process of periodically monitoring, calculating ($P_b$) and making necessary adjustments in channel allocation continues until the system is turned off.

Figure 3A:
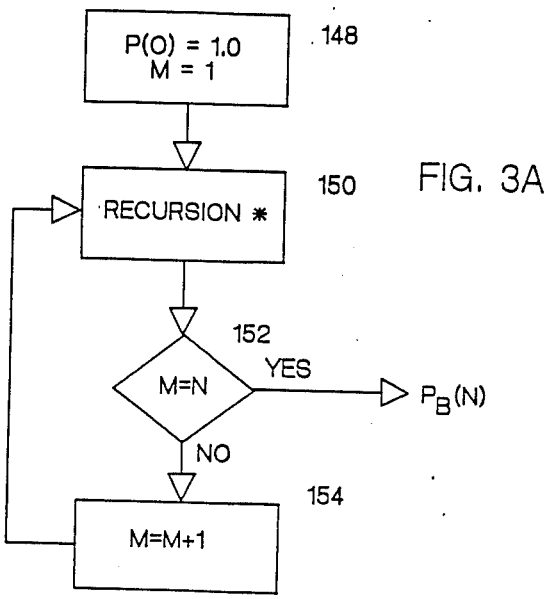
FIG. 3A shows an algorithm and process steps used to determine the probability of blocking.
Figure 3B:
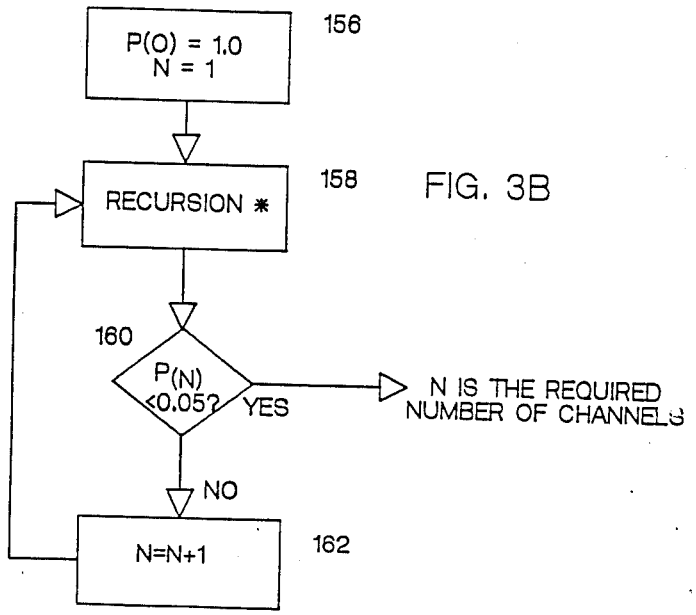
FIG. 3B shows an algorithm and process steps used to determine the required number of channels.

FIG. 3A show a program for determining the blocking probability $P_b$. The blocking probability $P_b$ is determined from a parameter recursively.

The recursion is defined as follows:

$$P_b(M) = \frac{E \times P(M-1)}{M + E \times P(M-1)}$$

where E is traffic intensity in Erlangs, M is the number of channels and P is the probability of blocking.

Referring again to FIG. 3A, the first step to calculate the probability of blocking is identified in block 148. In block 148 the following boundary conditions are set: $P(0)=1.0$; M=1=dummy counter. The program then descends into block 150 where it calculates the first pass in the recursion algorithm. The recursion function is identified above and will not be repeated here. From block 150 the program descends into block 152. In block 152 the program tests to see if M is equal to N. If it is not, then the program descends into block 154 where M is set equal to (M+1) and the program loops back into block 150. The looping (that is the recursion) continues until whenever M is equal to N the program exits along the "yes" path. The value of $P_b$ is then utilized as is previously described.

FIG. 3B shows the program which is used to calculate the required number of channels identified in block 136, FIG. 2. As stated above, the program also utilizes the recursion algorithm to determine N. The first step in the process is identified by block 156. In block 156 certain boundary functions for P and N are set. The program then descends into block 158 where it calculates the first value in the recursion algorithm. The program then descends into block 160 where it tests to see if $P_n$ is less than the lower limits of the probability range. In the preferred embodiment the lower range is set to 0.05. As stated before, a different value than 0.05 may be used.

If $P_n$ is greater than 0.05, the program exits the block along the no path into block 162. In block 162 the program sets N=(N+1) and enters into a loop. The looping continues until $P_n$ is less than 0.05. The program then exits block 160 along the yes path.

FIG. 1B shows the PBX telephone system with inbound signals from the T-1 trunk.

These signals are inputted to the T-1 trunk interface means 200, which provides signal-level conditioning and proper termination for the common carrier T-1 trunk. Digital signals representing serialized voice links and signaling information are carried by conductor 202 to the organization and demultiplex means 204. Means 204 extracts the parameter "N", the number of active channels, and separates the serialized digital signal into its component voice-links and signaling parameters. The number of active channels "N" is carried to the configuration means 208 via conductor 206. Configuration means 208 determines the previously described parameter "R" which assigns, via conductor 212, bit rates to the speech decoder bank means 210. "R" is determined from the greatest integer function, as previously described, by the relationship $$R = GI[1536/N].$$

The value of "N" is carried via conductor 214 to the enabling means 216. The enabling means operates switch banks 218 and 220 by signals carried via conductors 222. By activating a number of selected switches from banks 218 and 220, a given number of speech decoders N is made to decode and output speech signals into the PBX interface means 224. Speech is outputted on lines 301–396 a analogue or 12 or 8-bit PCM signals as appropriate for the attached PBX.

As we have shown, a circuit for the transmission of speech is established from input lines (FIG. 1A), through PBX interface means 100, switch banks means 114 and 116, speech coder means 108, organization and multiplex means 112, through the T-1 trunk interface means 124, via the common carrier T-1 trunk into interface means 200 (FIG. 1B), organization and demultiplex means 204, through switch banks 218 and 220, speech decoder means 210, and delivered to the PBX interface means 224 via conductors 301 through 396.

The number of such end-to-end circuits is N. The bit rate of the speech coders is R k bits/sec. Both R and N are changed as described to maintain the desired grade of service and blocking probability. The apparatus shown in FIGS. 1A and 1B appear at both ends of said voice circuit. A return path for the bidirectional voice circuit is provided with the sense of transmission reversed, as would be obvious to one skilled in the art.

Having thus described my invention, what I claim and desire to secure as Letters Patent is as follows:

1. In a telephone switching system having a trunk for carrying messages from a plurality of telephone lines a method for partitioning the trunk into channels so that each telephone line is assured access to a channel comprising the steps of:

(a) determining the message intensity in said trunk;

(b) utilizing said message intensity to compute a blocking probability ($P_b$) with said $P_b$ indicating the likelihood of a message being blocked within said trunk;

(c) correlating the blocking probability with a desired range of values; and (d) adjusting the number of channels in said trunk only if the blocking probability falls outside of the desired range.

2. The method set forth in claim 1 wherein the blocking probability $P_b(N)$ is being computed from the algorithm $$P_b = \frac{E \times P(N-1)}{N + E \cdot P(N-1)}$$

where E represents message intensity in Erlangs, N represents the number of channels and P represents the block probability during the last sampling period.

3. The method set forth in claim 2 wherein the blocking probability algorithm is being used in a recursive method for calculating the blocking probability.

4. The method set forth in claim 3 wherein the recursive method includes the steps of:
 (a) setting $P(o) = 1.0$ wherein P represents the probability of blocking;
 (b) setting $M = 1$; with M representing the value of a dummy counter;
 (c) utilizing the algorithm set forth in claim 2 for calculating an initial value of P;
 (d) setting $M = N$; with N representing the number of channels; and
 (e) utilizing the initial value for P as a final value for said P only if $M = N$.

5. The method set forth in claim 4 further including the steps of:
 (f) setting $M = M + 1$ only if $M \neq N$ in step (e);
 (g) repeating steps (c) through (g) until $M = N$.

6. The method set forth in claim 1 wherein the desired blocking probability range includes $0.01 \leq P_b \leq 0.05$.

7. In a telephone switching system having a trunk for carrying traffic generated from a plurality of telephone users, a circuit arrangement for dynamically partitioning the trunk so that each telephone user is being assured access to a channel comprising:
 means for monitoring said trunk and operable for generating a signal representing the intensity of traffic thereon;
 means responsive to the signal and operable for calculating a blocking probability parameter;
 means for comparing the blocking probability parameter with a desired range of values; and
 means operable for partitioning said trunk thereby providing an acceptable number of channels only if the blocking probability falls outside of the desired range.

8. In a telephone switching system having a PBX system for processing telephone signals from a plurality of users and a trunk for transmitting the process signals a method for partitioning said trunk in channels comprising the steps of:

(a) measuring the signal intensity at the trunk;

(b) utilizing said signal intensity for computing a value representing the probability ($P_b$) of blocking in said trunk;

(c) comparing the value in step (b) with a range of predetermined values;

(d) repartitioning said trunk into more or fewer channels only if the probability of blocking, step (b) falls outside of the range of predetermined values.

9. In a telephone switching system having a PBX system for processing telephone signals from a plurality of users and a trunk for transmitting the process signals a method for partitioning said trunk in channels comprising the steps of:

(a) generating a value representative of a blocking probability ($P_b$) at said trunk;

(b) determining if the value falls within a range of predetermined values; and (c) adjusting the number of channels in said trunk only if the blocking probability ($P_b$) falls outside of the range of predetermined values.

10. In a switching system having a PBX system for processing data provided from a plurality of telephone lines, one or more coders for compressing the data outputted from said PBX system and a single trunk line for transmitting the data, an improved method for controlling the switching system comprising the steps of:

(a) generating a number representative of a blocking probability ($P_b$) within said trunk line;

(b) determining if the number falls within a range of values;

(c) for numbers falling outside the range of values, repartitioning the single trunk line into a plurality of channels (N); and (d) adjusting at least one of the coder's coding rate (R) whereby a satisfactory grade of service is maintained and the number is moved within the range of values.

11. The method set forth in claim 10 wherein step (a) further includes the steps of (e) measuring traffic intensity at the trunk line; and (f) utilizing the traffic intensity to generate the blocking probability ($P_b$).

12. In a switching system having a PBX system for processing data provided from a plurality of telephone lines, one or more coders for compressing the data outputted from said PBX system and a single trunk line for transmitting the data, an apparatus for controlling the switching system comprising:

(a) means for generating a number representative of a blocking probability ($P_b$) within said trunk line;

(b) means for determining if the number fails within a range of values;

(c) means for repartitioning the single trunk line into a plurality of channels; and (d) means for adjusting at least one of the coder's coding rate (R) so that a satisfactory grade of service is maintained and the number is forced within the range of values.

* * * * *